US008591767B2

(12) United States Patent
Dickinson et al.

(10) Patent No.: US 8,591,767 B2
(45) Date of Patent: *Nov. 26, 2013

(54) FUNCTIONAL FLUID AND A PROCESS FOR THE PREPARATION OF THE FUNCTIONAL FLUID (75) Inventors: Theodore E. Dickinson, Huffman, TX (US); David John Parkinson, Clevedon (GB); Kevin E. Collier, Kaysville, UT (US)

(73) Assignee: Specialist Process Technologies Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/309,361

(22) Filed: Dec. 1, 2011

(65) Prior Publication Data

US 2012/0078027 A1 Mar. 29, 2012

Related U.S. Application Data (63) Continuation of application No. 12/092,887, filed as application No. PCT/GB2006/004164 on Nov. 7, 2006, now Pat. No. 8,080,225.

(30) Foreign Application Priority Data

Nov. 7, 2005 (GB) .................................. 0522694.9
Mar. 9, 2006 (EP) .................................... 06251247

(51) Int. Cl.
*C07C 7/00* (2006.01)

(52) U.S. Cl.
USPC ........... 252/192; 424/661; 423/220; 423/235; 423/242.1; 423/246

(58) Field of Classification Search
USPC ............... 423/220, 246, 235, 242.1; 502/407, 502/411; 252/192; 424/661
See application file for complete search history.

(56) References Cited

U.S. PATENT DOCUMENTS

| | | | |
|---|---|---|---|
| 3,808,321 A | 4/1974 | Fukui | |
| 3,990,953 A | 11/1976 | Austin | |
| 4,020,147 A | 4/1977 | Shidlovsky | |
| 4,029,747 A | 6/1977 | Merkl | |
| 4,571,328 A | 2/1986 | Rice | |
| 5,902,555 A | 5/1999 | Tatani et al. | |
| 6,024,866 A | 2/2000 | Weers et al. | |
| 6,063,346 A | 5/2000 | Luna | |
| 6,808,621 B1* | 10/2004 | Cisneros | 208/133 |
| 8,080,225 B2* | 12/2011 | Dickinson et al. | 423/220 |
| 2003/0037484 A1 | 2/2003 | Steinmann | |
| 2003/0178372 A1 | 9/2003 | Droughton et al. | |
| 2005/0075410 A1 | 4/2005 | Kokuta et al. | |
| 2005/0214199 A1 | 9/2005 | Hayashi et al. | |
| 2006/0000356 A1 | 1/2006 | Tomoe et al. | |

FOREIGN PATENT DOCUMENTS

| | | |
|---|---|---|
| CA | 1166434 A1 | 5/1984 |
| CA | 2491973 A1 | 7/2005 |
| CA | 2498427 A1 | 10/2005 |
| EP | 0544515 | 6/1993 |
| GB | 18090 | 6/1904 |
| GB | 1273256 A | 5/1972 |
| GB | 1280397 | 7/1972 |
| GB | 1313436 | 4/1973 |
| GB | 2409859 A | 7/2005 |
| WO | WO-9304001 | 3/1993 |
| WO | WO-9509809 | 4/1995 |
| WO | WO-9905742 A1 | 2/1999 |
| WO | WO-0248284 A1 | 6/2002 |
| WO | WO-02051968 A1 | 7/2002 |
| WO | 02/062916 * | 8/2002 |
| WO | WO-2005014478 | 2/2005 |
| WO | WO-2005123237 A2 | 12/2005 |

OTHER PUBLICATIONS

A Novel Sodium Silicate Fluoride Solution and a $H_2$ Gas Formed by a Reaction Between Si and an Aqueous Solution of NaOH and NaF; Isao Tsuyumoto, *J.Am. Ceram. Soc.*, 88[6] 1628-1630 (2005).
Suppression of Dioxins Formation in Flue Gas by Removal of Hydrogen Chloride Using Foaming Water Glass; Isao Tsuyumoto, *Organohalogen Compounds*-vol. 66 (2004) 1167-1172.
Office Action dated Aug. 12, 2010 for U.S. Appl. No. 12/092,887.
Office Action dated Nov. 16, 2010 for U.S. Appl. No. 12/092,887.

* cited by examiner

*Primary Examiner* — Steven Bos
(74) *Attorney, Agent, or Firm* — Honigman Miller Schwartz and Cohn LLP (57) ABSTRACT A functional fluid for the removal of contaminates such as but not limited to, acid causing components in gas, sulfur components and carbon oxides from fluid streams, and removal and treatment of $NO_X$ & $SO_X$ from post combustion emissions. Also described is the manufacturing process to produce the functional fluid both in a batch atmospheric process system as well as a closed system capable of operating at above or below atmospheric conditions.

59 Claims, 5 Drawing Sheets

MONOCHEM GAS SWEETENING PROCESS

$CO_2$ REMOVAL AND FLASH REGENERATION OF THE $CO_2$ AND MONOCHEM

FUNCTIONAL FLUID AND A PROCESS FOR THE PREPARATION OF THE FUNCTIONAL FLUID

The present invention generally relates to a functional fluid and particularly to a functional fluid for use in, for example, the treatment and removal of acids, sour components (e.g. H2S), and CO2, CO, NOX and SOX gases from fluid streams (e.g. a hydrocarbon based fluid stream) or post combusted fuels or gases. The invention also relates to a process for the preparation of the functional fluid.

BACKGROUND OF THE INVENTION

In the extraction, processing and refining, storage and combustion of hydrocarbon and carbon based compositions (e.g. crude oil, synthetic crudes, natural gas, coal and coke) significant quantities of toxic substances are encountered and/or produced. These substances include, for example, hydrogen sulfide gas, mercaptans, $SO_X$ gases (e.g $SO_2$ and $SO_3$) and $NO_X$ gases (e.g $NO$, $NO_2$ and $N_2O$). Hydrogen sulfide and mercaptans are often extracted with crude oil. Carbon dioxide, carbon monoxide and $SO_X$ gases can be produced during crude oil processing and refining. $NO_X$ gases can be produced upon combustion of hydrocarbon based fuels. Furthermore, post combustion fumes from coal fired power stations, coking plants and steel production plants generally contain one or more of these gases. There is therefore a continuing need for the development of compositions and processes which permit the removal of these gases from hydrocarbon based streams, chimneys and exhausts.

$H_2S$ scavenging compounds typically comprise amine adducts and the preparatory methods thereof often require the use of complex reaction protocols and environmentally toxic reaction materials. For example, GB 2409859 describes an oil-soluble sulfur scavenger including substantially monomeric aldehyde-amine adducts from the reaction of at least one sterically hindered primary or secondary amine and a molar excess of at least one aldehyde, or a donor thereof.

US Patent Application No. 2005/0214199 describes a large surface area manganese oxide compound used for removing pollutants such as $NO_X$, $SO_X$, and CO by adsorption and oxidation. The manganese oxide is prepared by the reaction of a bivalent manganese salt with alkali metal permanganate and hydroxide solutions in the presence of ion-exchanged water under specific reaction conditions. Removal rates of up to 35% are reported with respect to carbon monoxide.

Thus, there is a need for further compositions for use in the removal of toxic substances. There is also a need for compositions which can be prepared by way of relatively straight forward and economical reaction protocols. There is also a need for the preparation and isolation of compositions which have multifunctional use in a number of applications, such as those described above.

SUMMARY OF THE INVENTION

According to a first aspect of the present invention there is provided a process for the preparation of a functional fluid comprising reacting silicon, alkali metal hydroxide and a solution comprising water and chlorine in a reaction vessel at a temperature no greater than about 200° F. (93° C.).

Optional features of the first aspect of the invention are the subject of the dependent claims.

Thus, the process provides for the preparation and isolation of a new functional fluid by way of an economical and relatively straightforward process. The functional fluid has been found to have utility in a number of applications as an electron donor, reducing agent or antioxidant. Advantageously, the process provides a scavenging functional fluid without the need to include expensive organic chemicals which can result in the formation of reaction by-products. Such by-products can be problematic and expensive to dispose of, due to environmental concerns. A further advantage is that the functional fluid can be prepared under atmospheric or pressured conditions.

According to a second aspect of the invention there is provided a functional fluid having a specific gravity of about 1.25 to 5, and a pH of from about 9 to about 13, obtainable by the process of the first aspect of the invention.

Another advantage of the invention lies in the preparation and isolation of a functional fluid, which has multifunctional use. For example, in the oil and gas production industry the functional fluid can be used as an $H_2S$ scavenger in crude oil pumping pipes and as a corrosion inhibitor in the pipes. The fluid can further be used in the treatment of $CO_2$ and $NO_2$ which is produced during refining of the crude oil, and/or upon combustion of the crude product.

The functional fluid of the second aspect of the invention may be used as a CO, $CO_2$ or $H_2S$ scavenger.

The functional fluid may be used as a $H_2S$ scavenger in wet oil and gas production systems.

The functional fluid may be used in the treatment of NO (e.g. NO and $NO_2$) and $SO_X$ (e.g. $SO_2$ and $SO_3$) gases.

The functional fluid may be used in sour gas treatment systems.

The functional fluid may be used as a corrosion inhibitor.

The functional fluid may be used as a pacifier of carbon steel in order to reduce corrosion rates associated with acid gases.

The functional fluid may be used as an antifoaming agent.

The functional fluid may be used in the removal of contaminants from waste water or boiler feed water.

The functional fluid may be used as a store for hydrogen gas.

In accordance with a third aspect of the invention, there is provided a process for the desulfurization of a gaseous hydrocarbon feedstock comprising:
(i) contacting the gaseous hydrocarbon feedstock with a functional fluid as specified in the first and second embodiments under conditions suitable to form a sulfur-enriched functional fluid; and
(ii) recovering a desulfurized gaseous hydrocarbon feedstock from the sulfur-enriched functional fluid.

The process of the third aspect of the invention may optionally further comprise, the steps of:
(iii) contacting the sulfur-enriched functional fluid with a flocculating agent under conditions sufficient to allow precipitation of sulfur from the sulfur-enriched functional fluid; and
(iv) separating the precipitated sulfur from the fluid to recover a functional fluid as specified in the first or second aspect of the invention.

In accordance with a fourth aspect of the invention, there is provided a process for the removal of $CO_2$ from a gaseous hydrocarbon feedstock, having a $CO_2$ component, comprising the steps of:
(i) contacting the functional fluid and the gaseous hydrocarbon feedstock under conditions sufficient to dissolve the $CO_2$ in the functional fluid;
(ii) separating the gaseous hydrocarbon feedstock from the functional fluid; and
(iii) depressurizing the functional fluid to cause the evolution of $CO_2$ gas from the functional fluid.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION OF THE INVENTION

The functional fluid is formed by the reaction of an alkali metal or derivative thereof and silicon. The reactants used in the reaction process will first be described.

Silicon

Silicon used in the process of the invention can be elemental silicon, or silicon metal. Silicon metal exists in a number of purity grades. Examples of silicon metal which can be used in the process are silicon metal grade 551 (98.5% Si, 0.5% Fe maximum content, 0.10% Ca maximum content), silicon metal grade 553 (98.5% Si, 0.5% Fe maximum content, 0.30% Ca maximum content), silicon metal grade 441 (99% Si, 0.5% Fe maximum content, 0.10% Ca maximum content), silicon metal grade 442 (99% Si, 0.4% Fe maximum content, 0.20% Ca maximum content), silicon metal grade 4406 (99.3% Si, 0.4% Fe maximum content, 0.06% Ca maximum content), silicon metal grade 4403 (98.5% Si, 0.4% Fe maximum content, 0.03% Ca maximum content), silicon metal grade 331 (99.3% Si, 0.3% Fe maximum content, 0.10% Ca maximum content), silicon metal grade 3305 (99.4% Si, 0.3% Fe maximum content, 0.05% Ca maximum content), silicon metal grade 3303 (99.4% Si, 0.3% Fe maximum content, 0.03% Ca maximum content), silicon metal grade 2204 (99.5% Si, 0.2% Fe maximum content, 0.04% Ca maximum content), silicon metal grade 2202 (99.5% Si, 0.2% Fe maximum content, 0.02% Ca maximum content) or silicon metal grade 1501 (99.5% Si, 0.15% Fe maximum content, 0.01% Ca maximum content).

Silicon metal grade 441 is the preferred grade of silicon metal used in the process for preparing the functional fluid of the invention.

The silicon or silicon metal can comprise a range of particle sizes. These particles can be in the form of large chunks or ingots (e.g. having a mean diameter up to about 150 mm), or in powder form. In one embodiment, the silicon or silicon metal comprises particles with a mean particle diameter of between about 1 mm and about 150 mm. In another embodiment, the silicon or silicon metal comprises particles with a mean particle diameter of between about 24 mm and 150 mm. In a further embodiment, the mean particle diameter is greater than about 10 μm, such as greater than 100 μm, for example greater than 500 μm. The mean particle diameter may also be less than 10 mm, for example less than 5 mm, such as less than 2 mm or less than 1 mm. Where the particles are non-spherical, the term "diameter" refers to the largest dimension of the particle.

Some individual particles may have a diameter outside the specified values. However, preferably at least 50%, for example at least 95%, such as 99% of the particles have a diameter within the specified values. In an embodiment, substantially all of the particles have a diameter within the specified range.

Alkali Metal Hydroxide

The alkali metal hydroxide used in the process can comprise lithium hydroxide, sodium hydroxide or potassium hydroxide. In one embodiment sodium hydroxide is used. Combinations of lithium hydroxide, sodium hydroxide and potassium hydroxide can also be used in the process.

The alkali metal hydroxide (e.g. sodium hydroxide) can be used in solid form or in the form of a prepared aqueous solution of the alkali metal hydroxide. In solid form the alkali metal hydroxide can be in the form of flakes, pellets or powder.

Alternatively, the alkali metal hydroxide can be replaced by other alkali and alkaline earth metal hydroxide such as rubidium hydroxide, beryllium hydroxide, magnesium hydroxide, calcium hydroxide, strontium hydroxide or barium hydroxide.

Water and Chlorine Solution

The water and chlorine solution used in the process comprises water, preferably distilled water, and a source of chlorine. The chlorine source may be chlorine gas which is then dissolved in water.

In a preferred embodiment, the chlorine source is liquid chlorine, also known as sodium hypochlorite (NaOCl).

The water (preferably distilled) and liquid chlorine are combined in a ratio of between about 10:1 to about 30:1 by volume (water:liquid chlorine), for example between about 15:1 and about 25:1. In one embodiment, the ratio of water to chlorine is about 20:1.

The water and liquid chlorine can be combined prior to addition to the reaction vessel comprising the silicon and alkali metal hydroxide, or the water and chlorine can be added separately, in situ.

The Process and Resultant Functional Fluid

As discussed below, the duration of the process of the first aspect of the invention will depend on factors such as reaction temperature and reactant particle size (due to the effect of particle size on the surface area considerations). The duration of the reaction will be shorter when smaller particles are used and longer when larger particles are used. In most embodiments, the reaction duration will be longer than about an hour, for example longer than about 3 hours such as longer than about 6 hours. The reaction duration may also be less than about 3 days for example less than about 2 days such as less than about 1 day or less than about 12 hours. Since the reaction is exothermic, control of the reactant particle size provides a means of controlling to some extent the rate of reaction and hence the degree to which the reaction vessel requires cooling during the process of the first aspect.

The reaction vessel is maintained at a temperature below about 93° C. Subject to this constraint, in some embodiments, the reaction temperature may be maintained at a temperature of greater than about 60° C., for example greater than about 70° C. In an embodiment, the reaction temperature is maintained at a value of about 80° C.

The following discussion is limited to a process comprising silicon metal grade 441 and sodium hydroxide, by way of example. References to FIGS. 1 and 2 of the drawings are also included to assist in the understanding of the process of the invention. However, these are non-limiting, and the skilled person will be aware that the following discussion will be typical for a number of alternative systems as described above.

Figure 1:
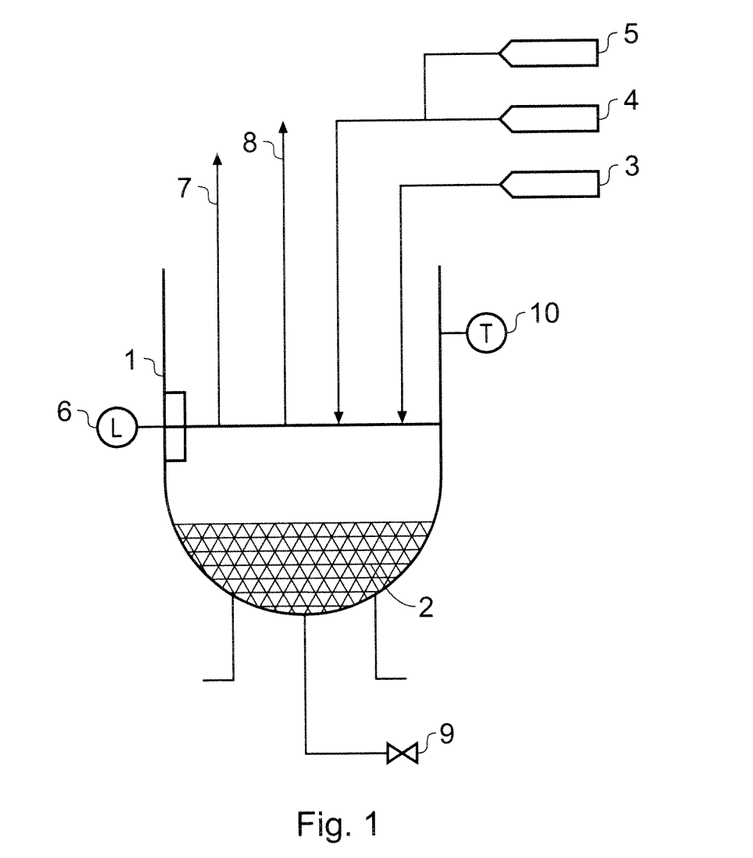
FIG. 1 is a schematic representation of an atmospheric process for the manufacture of the functional fluid of the invention.

Typically, silicon metal grade 441 and alkali metal hydroxide are combined in a reactor vessel. FIG. 1 shows an atmospheric batch process for the manufacture of the functional fluid of the invention. An open reactor 1, preferably manufactured from stainless steel, is loaded with silicon (silicon metal grade 441) 2 of a size distribution in the range of 24 mm to 150 mm mean diameter. The silicon 2 is loaded to a height equivalent to 30% of the reactor's volume including the voidage of the silicon particles 2. Sodium hydroxide 3 (in flake form) is added to the silicon 2 in reactor 1, to a level approximately equivalent to the voidage available in the silicon 2, such that the level of solids in the reactor is substantially unchanged. This is achieved by thoroughly mixing the silicon 2 and the sodium hydroxide 3. The amount of silicon to sodium hydroxide is typically about 1:1 by volume. It will be clear to the skilled person that the size of the silicon particles used will affect the rate of reaction (i.e. upon addition of the water-chlorine solution) depending on the surface area of the silicon particles.

Distilled water 4 is dosed with liquid chlorine 5, for example in a ratio of water to liquid chlorine of about 20:1 by volume, prior to introducing the same into reactor 1, and the reaction between the components begins. The water-chlorine solution is added to a level (level 6 in FIG. 1) at least equal to or greater than the level of the silicon/sodium hydroxide mix, such that the silicon/sodium hydroxide is completely immersed in water-chlorine solution.

Typically, there will be a time lag before any noticeable reaction occurs. This time lag will depend on the amount of reactants used (i.e. the volume ratio of the silicon to sodium hydroxide), and the particle size of the silicon 2 and sodium hydroxide 3. The resulting exothermic reaction begins to effervesce with the release of hydrogen gas 7 and steam 8. Therefore, suitable safety measures are to be employed. The reaction temperature is maintained such that it does not exceed about 200° F. (93° C.), and is preferably maintained below about 175° F. (80° C.). The temperature of the reaction is maintained using an external heating/cooling means 10, for example, by the use of a heating/cooling jacket. Additional water and/or water-chlorine solution is added as the reaction proceeds to maintain the level of the solution above the silicon/sodium hydroxide (i.e. to match the losses attributable to the hydrogen gas and steam losses).

Under the conditions described above, the reaction typically takes up to six hours, after which the degree of effervescence starts to diminish, and the resultant functional fluid is ready for decanting through outlet 9 by way of a suitable filtration medium to remove any unwanted particulate, which may continue to react. The finished chemical is then stored in sealed drums ready for utilization.

Figure 2:
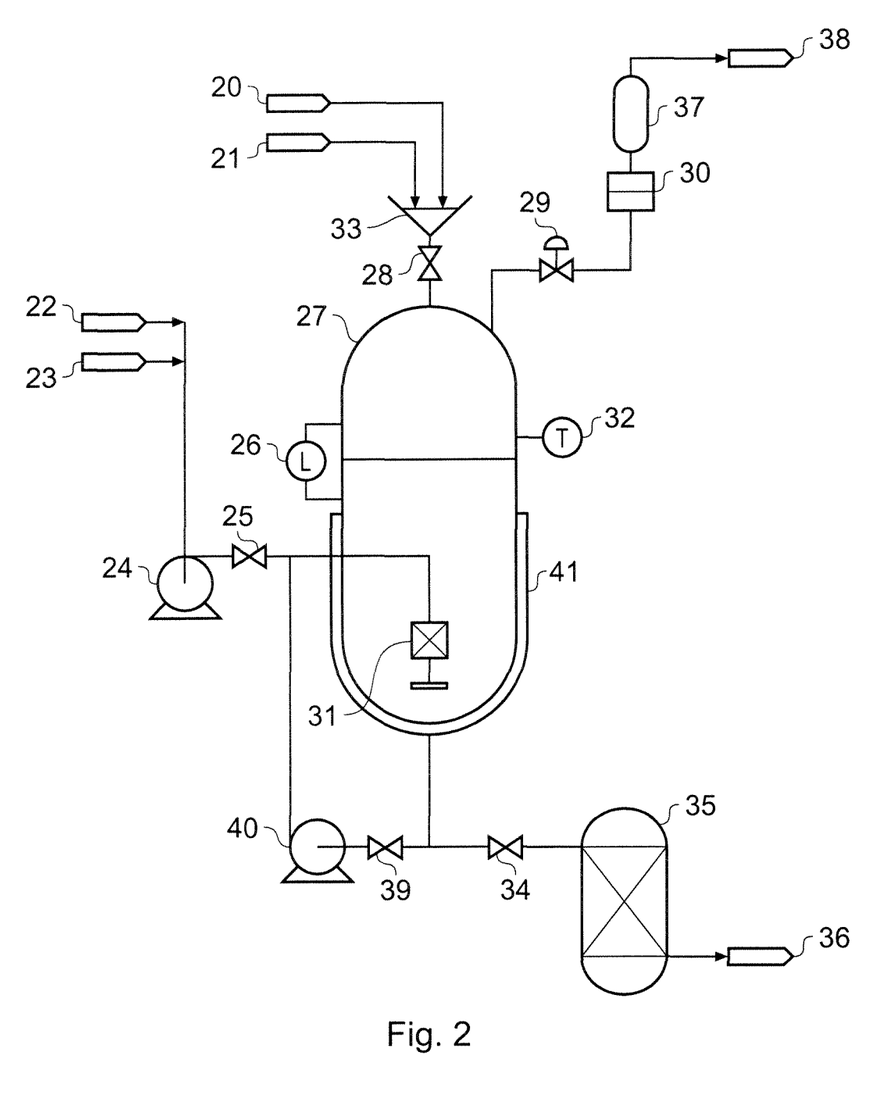
FIG. 2 is a schematic representation of an above or below atmospheric pressure closed system for the manufacture of functional fluid of the invention.

FIG. 2 shows an example of a closed or pressurized system apparatus, which can be operated at above or below atmospheric pressure. A hopper 33 is loaded with the same quantities and qualities as described for FIG. 1, of silicon 21 and sodium hydroxide 20, for a given batch size. However it has been found in practice that in a closed system, such as that shown in FIG. 2, silicon of a considerably smaller particle size distribution as low as 1 mm can be used, thus enabling the surface area of silicon available for contact to be increased substantially. This, together with the ability to control the pressure within the vessel by a pressure control means 29 allows the reaction to be more controlled, and hence reduces the time required for reaction of the silicon to produce the required chemical. The silicon 21 and the sodium hydroxide 20, are fed from the hopper 33, controlled by a valve means 28, into the reaction pressure vessel 27. The valve means 28 then closes, and a pump 24 starts, which is fed by a water 23 and chlorine 22 mixture. This mixture reports by way of valve means 25 to a vortex generator 31, situated within the pressure vessel 27. The reaction then begins and is further accelerated by the constant inter-mixing of the particles 20 and 21 and liquid 22 and 23, by the centrifugal forces within the vortex.

The hydrogen gas and steam generated by this reaction are collected in the upper portion of pressure vessel 27, and the pressure inside the pressure vessel 27, is controlled to the required set point by a pressure sensor, controller and a pressure control valve 29. The gases removed from the pressure vessel 27 can be routed to a flame arrestor 30, and or a scrubber/condenser 37, which in turn, if required, can re-route the hydrogen back into the pressure reactor 27 without the associated water vapor caused by the reaction. Thus the hydrogen can be reabsorbed to further enrich the chemical, or if not required can be stored or led to a disposal flare. It is a further requirement of the process, that the liquid level in the pressure reactor 27 stays within required level limits. Therefore the level indicator 26 has the ability to run the pump 24 and to actuate valve means 25 to add makeup water as required. When pump 24 is not in operation and it is required to maintain the vortex within pressure reactor 27, then a pump 40 starts and re-circulates the chemical product through the vortex generator 31 as required to keep the solids 20 and 21 in suspension.

A cooling jacket 41 can be fed with a cooling medium in order to regulate the process temperature to within the required limits by interaction with the temperature controller 32. If required, a vacuum may be employed on the vapor outlet 29, which in some conditions will enhance the production of chemical. When the chemical reaction is complete, the pump 40 stops and valve means 39 closes. The valve means 34 opens and the product chemical reports to the filter 35, and on to storage vessel 36.

The role of the liquid chlorine in the reaction is not fully understood, but without wishing to be bound by theory it is believed that the chlorine acts as an electron sink to the reaction. If liquid chlorine is not used, then sodium silicate salts will form instead of the functional fluid. If an aqueous sodium hydroxide solution is used, then the time lag will be much shorter due to the presence of liquid water prior to the addition of the water-chlorine solution. In these circumstances, the liquid chlorine should be added prior to effervescence to minimize silicate formation.

The functional fluid prepared by the reaction described above is a typically clear and transparent, viscous liquid having a specific gravity of about 1.25 to 5, for example about 5, and a pH in the range of from about 9 to about 13, for example from about 9 to about 12. The functional fluid, however, can sometimes appear translucent. The functional fluid may be used as prepared, or can be used in a diluted form; for example, the functional fluid may be diluted to a specific gravity of about 1.25 prior to use.

Characterization of Functional Fluid of the Invention

The precise composition and form of the functional fluid is not fully understood, but it is believed that silicon and alkali metal ions form a water soluble monomeric inorganic complex upon reaction with the water chloride solution. It is not clear if the chlorine, probably present as chloride ions, forms part of the inorganic complex. The resulting functional fluid comprising the silicon-alkali metal complex is found to be electron rich (possibly comprising free electrons), and readily acts as a reducing agent in the presence of other chemicals with the conversion of these chemicals to water soluble salts, or even elemental compounds. For example, upon reaction between the functional fluid and $H_2S$, elemental sulfur can be formed.

Thus, the functional fluid of the present invention has the ability to selectively remove targeted contaminates from any carbon based fluid stream.

Utility of the Functional Fluids of the Present Invention

The functional fluid of the invention has utility in a number of applications, for example:
- as a $CO_2$ Scavenger
- as a $H_2S$ Scavenger
- in the treatment of $NO_X$ (e.g. NO and $NO_2$) & $SO_X$ (e.g. $SO_2$ and $SO_3$) gases
- as a Corrosion inhibitor
- in the enhancement of existing sour gas treatment systems such as Amine plants
- in the removal of contaminates from water e.g. pre-treatment of boiler feed water and waste water treatment for Volatile Organic Compounds (VOC) and Methyl Tertiary Butyl Ether (MTBE) and destruction of many forms of bacteria such as feta coli forms, cryptosporidium and legionnaires
- rejection of Hydrocarbons from oil wetted solids, for example, in tight rock formations through which oil is flowing, the functional fluid wets the production zone and is attracted to the rock formation, thus forcing the oil off the rock, reducing drag and improving oil flow
- in the removal of all types of sulfur containing substances, in particular carbonyl sulfide (COS) which is know to hydrolyze with water to form $H_2S$, S, and $CO_2$
- as an anti foaming agent
- as a flame retardant
- as an anti-oxidant corrosion inhibitor, for example, when the chemical is injected into a pipeline or vessel made from carbon steel, it has the ability to protect the pipeline or vessel from corrosion
- as a medicament or in the manufacture of a medicament, for example, for the treatment of an insect bite, a virus and/or blood condition.

Process for Desulfurization of Gaseous Hydrocarbon Feedstocks

In the third aspect of the invention, the gaseous hydrocarbon feedstock (which may be, for example, natural methane gas) may be contacted with the functional fluid of the invention using any suitable apparatus known in the art for that purpose. For example, an inline mixer/contactor or a counter current flow stripping tower may be used.

By contrast with prior art desulfurization units such as amine systems, the process of the third aspect does not require boilers, heaters, acid stripping or re-injection process units. The process of the third aspect may therefore be carried out at ambient temperature, for example greater than about 5° C., such as greater than 10° C. or greater than about 15° C. The process temperature may be less than about 60° C., for example less than about 40° C., such as less than 30° C. This process is therefore particularly useful in e.g. pretreating natural methane gas prior to processing in Liquified Natural Gas (LNG) plants offshore, where close proximity of heat sources to the cryogenic units and cool boxes would present a hazardous operation.

The process of the third aspect of the invention may optionally further comprise, the steps of:
(iii) contacting the sulfur-enriched functional fluid with a flocculating agent under conditions sufficient to allow precipitation of sulfur from the sulfur-enriched functional fluid; and
(iv) separating the precipitated sulfur from the fluid to recover the functional fluid of the first or second aspect of the invention.

The flocculating agent may be any known flocculating agent capable of inducing sulfur precipitation in the alkaline environment of the functional fluid. For example, the flocculating agent may be an alkali metal halide, preferable sodium chloride.

The precipitated sulfur may be separated by any suitable separation process. For example a plate filter press may be used. Use of a plate filter press has been found to give a reasonably dry solid suitable for skip disposal from site. Tests to date have shown that the solids generated by this process are suitable for land farming and result in minimal environmental impact.

The process in accordance with the third aspect of the invention has been found to be capable of reducing the level of hydrogen sulfide in natural methane gas from a level in the region of 10,000 ppm to a level of less than 1 ppm.

The process may further comprise the step of recycling the recovered functional fluid for use in step (i) of the third aspect of the invention.

Prior to recycling, the pH of the recovered functional fluid may be modified to be greater than about 12, for example to a pH of about 13. This may be achieved by adding an alkali metal hydroxide, for example sodium hydroxide.

The gaseous hydrocarbon feedstock may be any gaseous hydrocarbon feedstock but would most typically be a feedstock comprising predominantly methane such as natural gas.

The third aspect of the invention will now be illustrated by reference to a process for the removal of $H_2S$ from a methane feedstock. References to FIGS. 3 and 4 of the drawings are also included to assist in the understanding of the process of the invention. However, these are non-limiting, and the skilled person will be aware that the following discussion will be typical for a number of alternative systems as described above.

Figure 3:
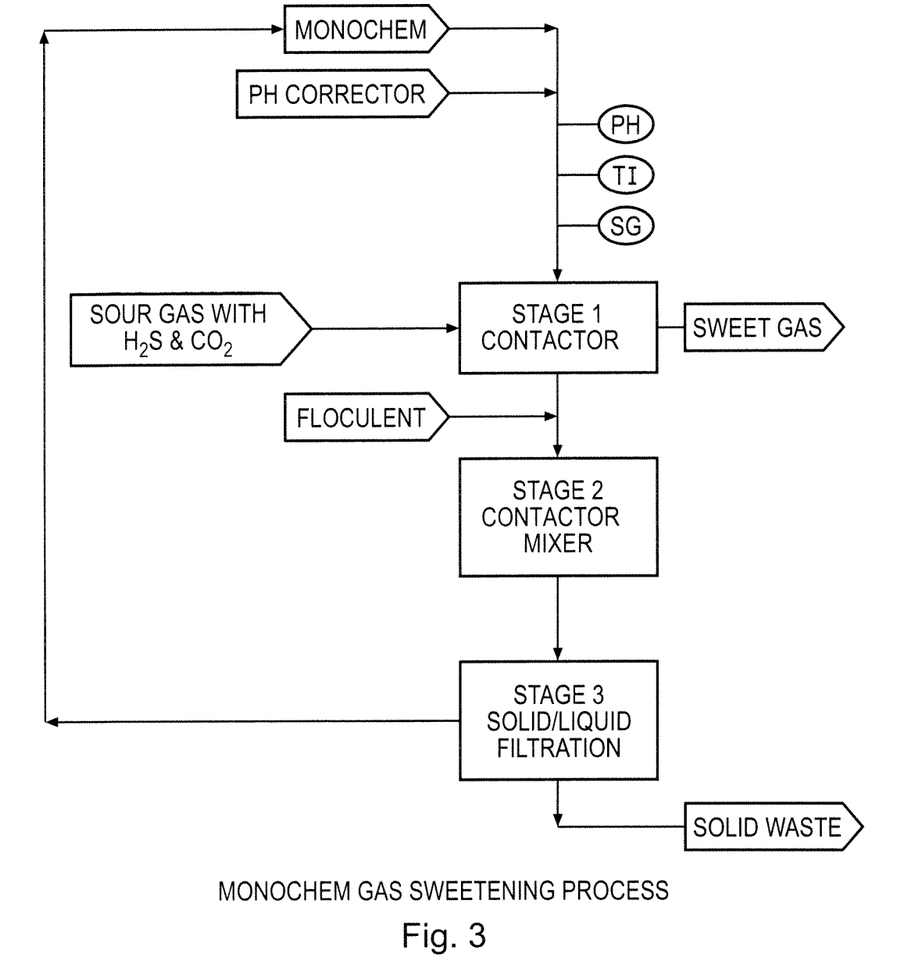
FIG. 3 is a schematic representation of a process for the removal of $H_2S$ from a methane gas feed.

FIG. 3 shows a three stage process exemplifying the third aspect of the invention.

The gas to be treated is fed to the stage one contactor in which the functional fluid (designated MonoChem) and the sour gas are caused to contact each other. The functional fluid strips out the $H_2S$ and rejects the methane gas. The on spec sweetened gas then exits the stage one contactor and is directed towards either a tertiary polishing system or, if the gas condition is acceptable, to an export gas pipeline for use.

The functional fluid enriched with $H_2S$ from the stage one contactor is then directed, under level control in the case of a contacting tower, to stage two, to a secondary smaller mixer/contactor, with enough residence time to act as a development tank. Flocculent is added to the MonoChem stream on the inlet to this tank to allow the sulfur to flocculate and develop as a solid.

The liquid and solids mixture from stage two, is then directed towards stage three, which can be any form of liquids/solids filtration or clarification. In practice, a plate filter press has proven to be adequate for this purpose, giving a reasonably dry solid suitable for skip disposal from site. Tests to date have shown that the solids generated by this process are suitable for land farming with minimal environmental concerns.

The liquid filtrate from stage three is recycled to stage one, for reuse in the process. Depending on the pH of the recycled functional fluid and its specific gravity, a pH correction chemical may be added to maintain the pH of the functional fluid at about 13.

In FIG. 3 the functional fluid of the invention is re-circulated in the system at a flowrate determined by the amount of $H_2S$ to be removed from the gas stream. In one example 10 US gallons per minute (37.85 liters per minute) (was sufficient to remove up to 10,000 ppm of $H_2S$ from 700,000 standard cubic feet per day (SCFD) (19,822 cubic meters per day) of natural gas.

The above mentioned process has also proved to be of use in removing $CO_2$. The $CO_2$ can be witnessed flashing off to a gas phase again once the MonoChem pressure is dropped. To date. $CO_2$ levels of up to 10,000 ppm together with 10,000 ppm of $H_2S$ in a methane gas stream have been removed simultaneously.

The Retrofit Application of the Process of the Third Aspect

In practice, existing gas treatment process plants, such as Amine and Claus units can be a bottleneck in systems where the inlet conditions have changed for whatever reason, for example:

Volume of gas increases
Pressure drops
Volume of $H_2S$ increases
Variations in Inlet Temperature Changes of this type, to the inlet of Amine systems can upset the operation and require system changes, which in most cases set up and cause chain reactions in plant operation leading to major upsets.

Due to the simplicity of the MonoChem functional fluid system it is now possible to offer a process stage to be applied upstream of existing gas sweetening plants to effectively debottleneck the process, or to substantially reduce maintenance cost where the existing system is of the absorption type, which requires spent material to be removed and replaced.

Figure 4:
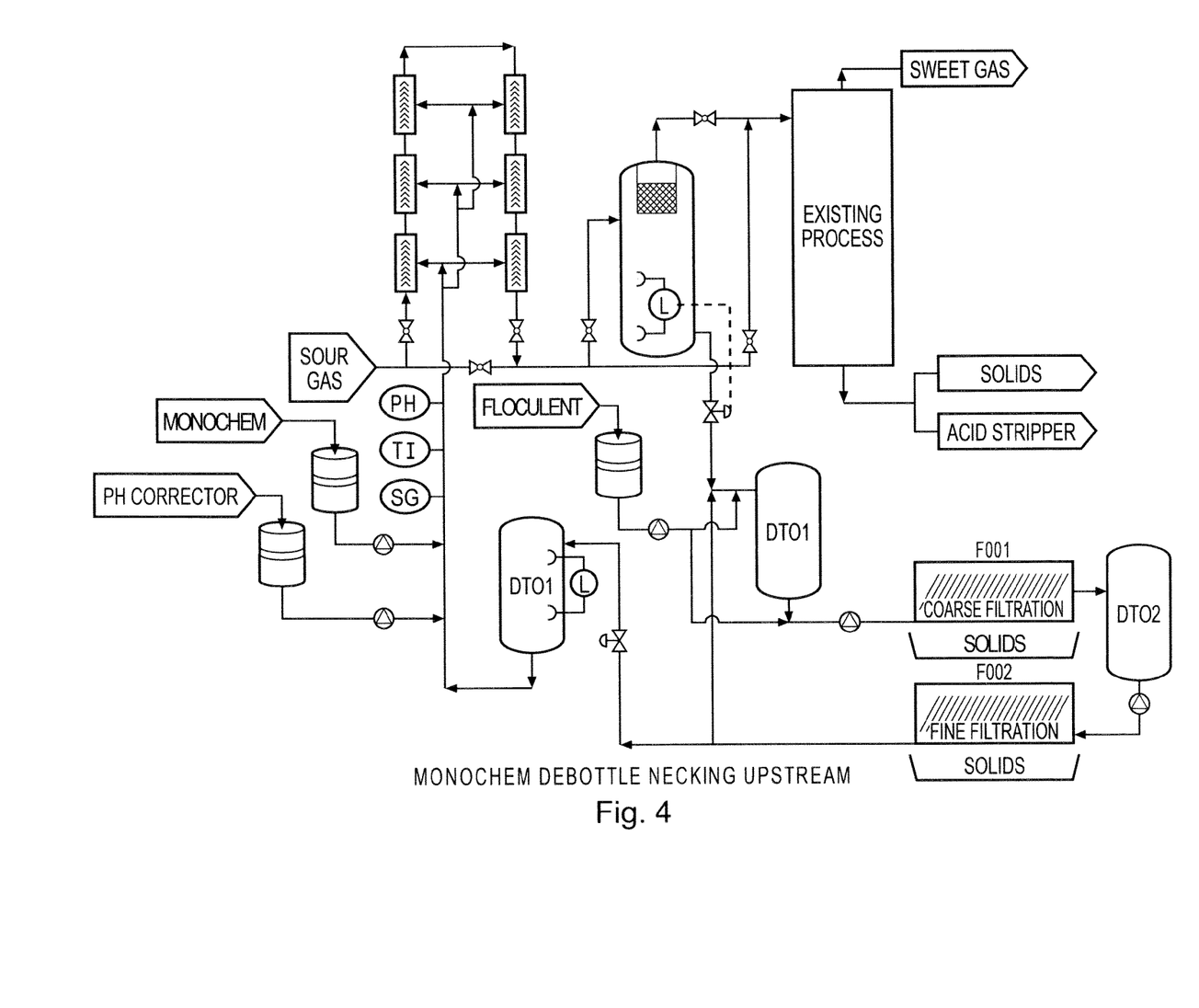
FIG. 4 is a schematic representation of an example of a desulfurization process applied to an existing desulfurization process as a retrofit.

FIG. 4 shows such a system.

In FIG. 4, a functional fluid compact contactor system is positioned in front of an existing gas treatment plant. The functional fluid compact contactor can optionally be bypassed or can be used to treat a proportion of the total flow of gas to be treated. The proportion of gas treated can be sufficiently large such that when re-combined with the untreated gas, the resultant ppm of $H_2S$ left in the system is manageable by the existing gas treatment plant.

In FIG. 4, several inline mixer/contactors are used in series with each unit having MonoChem injected into it. Each unit is capable of removing up to 50% of the bulk $H_2S$ in the gas inlet as described in Table 1 below. This is an example illustrating the process. The removal efficiency of each stage is dependant on factors such as the condition of the functional fluid at each stage and the levels of contaminate present in the feed at that stage:

TABLE 1

|  | $H_2S$ in ppm | $H_2S$ out ppm |
| --- | --- | --- |
| Contactor Mixer 1 | 6000 | 3000 |
| Contactor Mixer 2 | 3000 | 1500 |
| Contactor Mixer 3 | 750 | 375 |
| Contactor Mixer 4 | 375 | 188 |
| Contactor Mixer 5 | 188 | 94 |

Generally, it can be said that the more units that are employed, then the better the $H_2S$ removal will be, although there will be a point at which the benefit gained from extra units is minimal.

The retrofit system is normally designed to achieve an overall removal level of up to 95% leaving the final $H_2S$ to be removed in the existing equipment. Such a retrofit system offers several advantages to the process plant operators, such as:

By use of hot tapping into the existing plants inlet piping, the modifications need not necessarily cause a plant shut down.

If required the existing Amine tower can be converted quickly to a system using MonoChem with the MonoChem reporting to the development tank and filter units used to recover the MonoChem from the pipeline contactors. In this way, the Amine plants downstream units are rendered redundant, thus substantially reducing emissions from the site.

No liquid acid is formed thus there is no need to remove a liquid acid from site.

The possibility of conversion of sulfur solids into fertilizer, for commercial use.

Selective Removal $CO_2$ from a Gaseous Hydrocarbon Feedstock Comprising $CO_2$ and Sulfur Components In accordance with a fourth aspect of the invention, there is provided a process for the removal of $CO_2$ from a gaseous hydrocarbon feedstock, having a $CO_2$ component, comprising the steps of:

(i) contacting the functional fluid and the gaseous hydrocarbon feedstock under conditions sufficient to dissolve the $CO_2$ in the functional fluid;

(ii) separating the gaseous hydrocarbon feedstock from the functional fluid; and (iii) depressurizing the functional fluid to cause the evolution of $CO_2$ gas from the functional fluid.

In this aspect of the invention, the gaseous hydrocarbon feedstock (which may be, for example, natural methane gas) may be contacted with the functional fluid of the invention using any suitable apparatus known in the art for that purpose. For example, an inline mixer/contactor or a counter current flow stripping tower may be used.

The pressure at which the functional fluid and gaseous hydrocarbon feedstock are contacted will depend on the degree of $CO_2$ removal from the feedstock required. Under conditions of higher pressure, more $CO_2$ will dissolve in the functional fluid. Typically, the pressure of the system will be greater than 1 atm, for example greater than 5 atm such as greater than 10 atm. The pressure may also typically be less than 30 atm, for example less than 20 atm.

In an alternative embodiment, the functional fluid and gaseous hydrocarbon feedstock may be contacted under conditions of ambient or even below ambient pressure, provided that, following step (ii) above (the separation of the gaseous hydrocarbon feedstock from the functional fluid), the pressure is further lowered to cause evolution of $CO_2$ from the functional fluid.

The solubility of $CO_2$ in the functional fluid is believed to be inversely proportional to the fluid temperature. Therefore, in order to increase the solubility of $CO_2$ in the functional fluid, the functional fluid may be provided at a reduced temperature. The fluid may in principle be provided at any temperature above its freezing point, with the highest $CO_2$ solubility being exhibited at the lowest temperatures. However, there is an economic consideration associated with cooling the functional fluid and so in some embodiments, the fluid will be provided at higher temperatures. In some embodiments, the fluid is provided at a temperature of below about 50° C., for example below about 40° C. or below about 30° C. The fluid may also be provided at a temperature below about 20° C. for example below about 10° C. In a preferred embodiment, the fluid is provided at a temperature below about 5° C., such as in the range from about 1-3° C., for example about 2° C.

The process may further comprise the step of liquefying the separated $CO_2$ gas obtained in step (iii) of the process. This process is therefore advantageous in that it allows the collection of $CO_2$ for commercial applications, not least to prevent it escaping to the environment. Liquidized $CO_2$ has a well advanced market in the following areas:

(a) Downhole fractionation ($CO_2$ fracs).
(b) Secondary or Enhanced Oil Recovery (EOR) formation flooding.
(c) PLM and NGL treatment for stranded gas.
(d) Many other Commercial and Industrial uses of $CO_2$.

In an alternative embodiment, which is presently less preferred, following dissolution of the $CO_2$ in the functional fluid it is possible to break the bond between the $CO_2$ and the functional fluid and filter out the carbon content as a solid, typically bicarbonate of soda, with $O_2$ being released into the system. In this embodiment, the functional fluid is sacrificed as a scavenger and so results in depletion of the functional fluid.

In an embodiment of the fourth aspect of the invention, the hydrocarbon feed comprises sulfur-containing compounds (such as $H_2S$) in addition to the $CO_2$ component specified. It has surprisingly been found that by providing the functional fluid at a reduced temperature, it is possible to selectively separate $CO_2$ from the hydrocarbon feedstock, without removal of the $H_2S$ component. In this embodiment of the invention, the functional fluid may be provided at a temperature below about 5° C., preferably in the range from about 1-3° C., for example at a temperature of about 2° C.

The process may also further comprise the removal of the sulfur compounds of the separated gaseous feedstock using the process of the third aspect of the invention.

Figure 5:
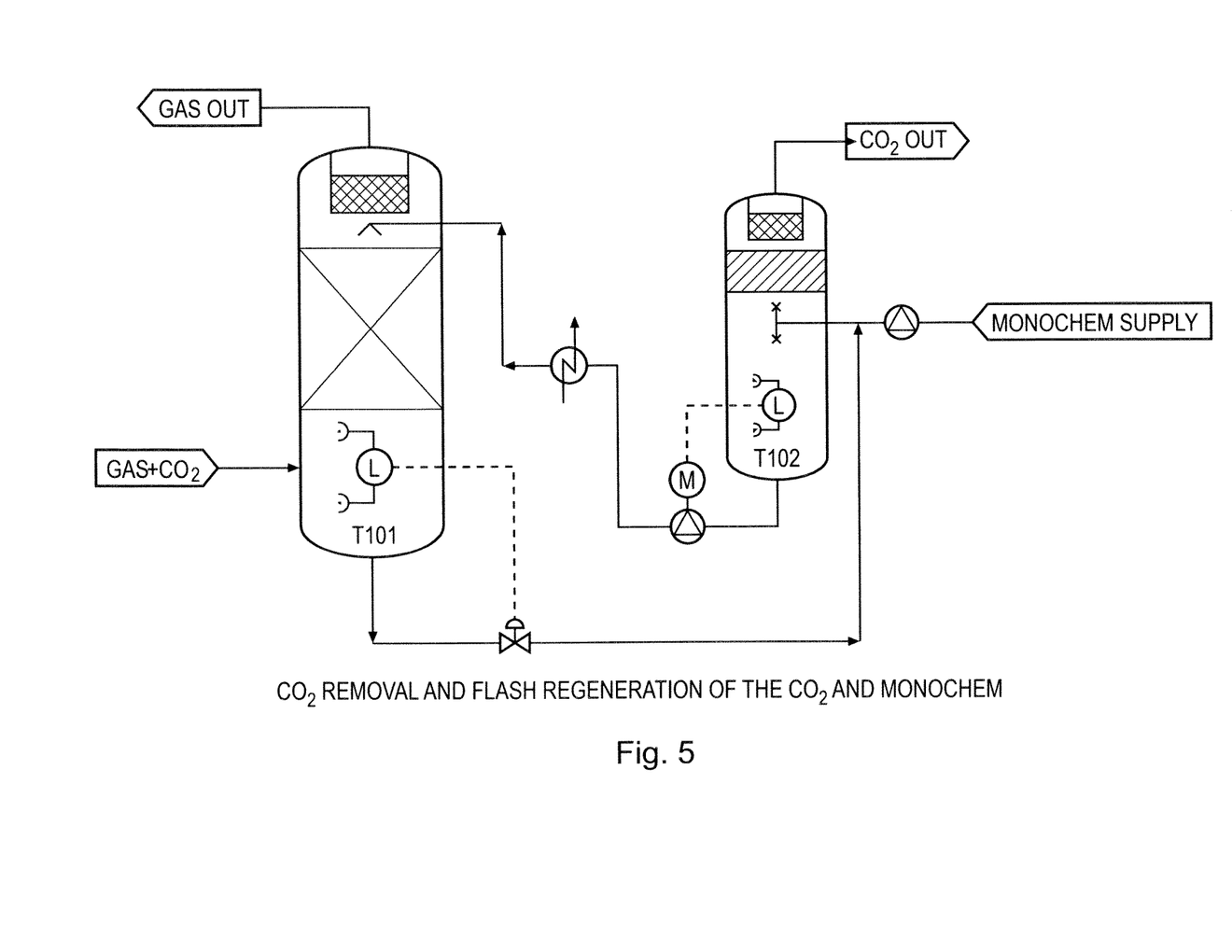
FIG. 5 is a schematic representation of a process for the removal of $CO_2$ from a methane gas feed.

The fourth aspect of the invention will now be illustrated by reference to a process for the removal of $CO_2$ from a methane feedstock containing $CO_2$ and $H_2S$. Reference to FIG. 5 of the drawings is included to assist in the understanding of the process of the invention. However, reference to this figure is non-limiting, and the skilled person will be aware that the following discussion will be typical for a number of alternative systems as described above.

FIG. 5 below shows a typical system for use when $CO_2$ and $H_2S$ coexist in a methane gas stream and it is required that $CO_2$ be selectively removed for the gas stream.

For the removal of $CO_2$ from a natural methane gas stream, pressurized methane gas and associated $CO_2$ is directed into contactor T101 where a stream of the functional fluid of the invention (M), at a temperature around 1 to 2° C., is distributed above typically a random packing inside a counter-current stripping tower. The gas contacts the functional fluid, where the $CO_2$ associated with the gas preferentially dissolves in the functional fluid. The functional fluid rejects the methane gas which then exits the contactor. A level control valve (L) allows the functional fluid with the $CO_2$ in solution to exit the contactor where it is directed to the $CO_2$ extraction vessel T102, by way of an array of spray nozzles. A drop in pressure in vessel T102 together with the agitation caused by the spray nozzles drives the $CO_2$ out of the solution. The $CO_2$ exits the top of T102 by way of a mist eliminator. Depending on the process and local environmental regulations, the $CO_2$ can then be flared or liquidized for use in flooding or used in other applications.

The functional fluid free of $CO_2$ exits the bottom of T102 and is pumped through a refrigerated heat exchanger to cool it back to the required 1 to 2° C. The functional fluid leaves the heat exchanger and is directed to contactor T101 through the spray nozzle which soaks the contactor packing and the process is repeated. Little or no MonoChem is consumed in the process; any losses are replenished by a MonoChem make up system.

EXAMPLES OF USE

A functional fluid was prepared and tested as follows:
The functional fluid was tested on exhaust gases from a gas turbine fueled with natural gas, running at about 720 rpm. $NO_x$, CO, $O_2$ and $CO_2$ levels were monitored over a period of 1 hour. The results are shown in Table 1A and 1B. In experiments C-1A, C-2A and C-3A, the levels of gases in the exhaust were measured over 1 hour. In experiments C-1B, C-2B and C-3B the exhaust gases were passed through the functional fluid in a contacting vessel, and the levels of gases in the exhaust after passing through the functional fluid were measured for 1 hour.

TABLE 1A

| Test run | C-1A | C-1B | Destruction (%) | C-2A | C-2B | Destruction (%) |
|---|---|---|---|---|---|---|
| Ambient conditions | | | | | | |
| (inches of Hg) | 29.86 | 29.86 | | 29.79 | 29.79 | |
| Temp (° F. dry) | 51 | 52 | | 52 | 52 | |
| Temp (° F. wet) | 46 | 48 | | 48 | 48 | |
| Humidity (lb x/lb air | 0.0054 | 0.0061 | | 0.0061 | 0.0061 | |
| Engine speed (rpm) | 720 | 722 | | 721 | 722 | |
| Emissions | | | | | | |
| $NO_x$ (ppmvd) | 2217 | 130 | 94.1 | 2224 | 134 | 94.0 |
| CO (ppmvd) | 6025 | 446 | 92.6 | 5736 | 528 | 90.8 |
| $O_2$ (%) | 0.2 | 19.4 | | 0.14 | 19.2 | |
| $CO_2$ (%) | 11.9 | 0.42 | | 11.9 | 0.5 | |

TABLE 1B

| Test run | C-3A | C-3B | Destruction (%) |
|---|---|---|---|
| Ambient conditions | | | |
| (inches of Hg) | 29.82 | 29.82 | |
| Temp (° F. dry) | 51 | 51 | |
| Temp (° F. wet) | 47 | 47 | |
| Humidity (lb x/lb air | 0.0059 | 0.0059 | |
| Engine speed (rpm) | 721 | 720 | |
| Emissions | | | |
| $NO_x$ (ppmvd) | 2101 | 91 | 95.7 |
| CO (ppmvd) | 6316 | 548 | 91.3 |

TABLE 1B-continued

| Test run | C-3A | C-3B | Destruction (%) |
|---|---|---|---|
| O$_2$ (%) | 0.14 | 19.1 | |
| CO$_2$ (%) | 11.7 | 0.57 | |

The invention claimed is:

1. A process comprising the steps of:
obtaining a functional fluid having a specific gravity of about 1.25 to 5, and a pH of from about 9 to about 13 by reacting silicon, alkali metal hydroxide and a solution comprising water and a chlorine source in a reactor vessel at a temperature of no greater than about 200° F. (93° C.), wherein the chlorine source is chlorine gas or liquid chlorine.

2. The process according to claim 1, having a specific gravity of about 5, and a pH of from about 9 to about 12.

3. The process according to claim 1, wherein the silicon and alkali metal hydroxide are added to the reaction vessel prior to the addition of the solution comprising water and chlorine.

4. The process according to claim 1, wherein the chlorine source is liquid chlorine.

5. The process according to claim 4, wherein the water and liquid chlorine are in a ratio of from about 10:1 to about 30:1 by volume.

6. The process according to claim 5, wherein the water and liquid chlorine are in a ratio of about 20:1 by volume.

7. The process according to claim 1, wherein the amount of silicon to alkali metal hydroxide is in a ratio of from about 1:5 to about 5:1 by volume.

8. The process according to claim 6, wherein the amount of silicon to alkali metal hydroxide is about 1:1 by volume.

9. The process according to claim 8, wherein additional solution comprising water and liquid chlorine is added at a rate sufficient to maintain the reaction until one or more of the silicon or alkali metal hydroxide is spent.

10. The process according to claim 1, where the reaction temperature is no greater than about 175° F. (79° C.).

11. The process according to claim 1, wherein the metal of the alkali metal hydroxide is lithium, sodium or potassium.

12. The process according to claim 11, wherein the metal is sodium.

13. The process according to claim 12, wherein the sodium hydroxide is in solid form.

14. The process according to claim 12, wherein the sodium hydroxide is in the form of an aqueous solution.

15. The process according to claim 1, wherein the silicon is silicon metal grade 441.

16. The process according to claim 1, wherein the silicon comprises particles having a mean particle diameter ranging from about 1 mm to about 150 mm.

17. The process according to claim 16, wherein the silicon comprises particles having a mean particle diameter ranging from about 24 mm to about 150 mm.

18. The process according to claim 1, wherein the water is distilled water.

19. The process according to claim 1, wherein the reactor vessel is open to the atmosphere.

20. The process according to claim 1, wherein the reactor vessel is closed to the atmosphere.

21. The process according to claim 13, wherein the silicon and sodium hydroxide in solid form are loaded to a height equivalent of about 30% of the reactor vessel's volume, prior to addition of the solution comprising water and liquid chlorine.

22. The process according to claim 1, further comprising the steps of:
contacting a gaseous hydrocarbon feedstock with the functional fluid for scavenging CO, CO$_2$ or H$_2$S from the gaseous hydrocarbon feedstock.

23. The process according to claim 1, further comprising the steps of:
contacting a gaseous hydrocarbon feedstock with the functional fluid for
scavenging H$_2$S from the gaseous hydrocarbon feedstock in wet oil and gas production systems.

24. The process according to claim 1, further comprising the steps of:
contacting a gaseous hydrocarbon feedstock with the functional fluid for removing NO$_x$ and SO$_x$ gases from the gaseous hydrocarbon feedstock.

25. The process according to claim 1, further comprising the steps of:
contacting a gaseous hydrocarbon feedstock with the functional fluid for removing a sour component from a sour gas in sour gas treatment systems.

26. The process of claim 1, further comprising the steps of:
utilizing the obtained functional fluid to desulfurize a gaseous hydrocarbon feedstock by
(i) contacting the gaseous hydrocarbon feedstock with a functional fluid under conditions suitable to form a sulfur-enriched functional fluid; and
(ii) recovering a desulfurize gaseous hydrocarbon feedstock from the sulfur-enriched functional fluid.

27. A process as claimed in claim 26, further comprising, the steps of:
(iii) contacting the sulfur-enriched functional fluid with a flocculating agent under conditions sufficient to allow precipitation of sulphur from the sulfur-enriched functional fluid; and
(iv) separating the precipitated sulfur from the fluid to recover a functional fluid.

28. A process as claimed in claim 27, further comprising the step of recycling the functional fluid for use in step (i).

29. A process as claimed in claim 28, wherein the pH of the recycled functional fluid is modified to be greater than about 12.

30. A process as claimed in claim 29, wherein the pH of the recycled functional fluid is modified to about 13.

31. A process as claimed in claim 26, wherein the gaseous hydrocarbon feedstock is predominantly natural methane gas.

32. A process as claimed in claim 26, wherein the process conditions are such that CO$_2$ is also removed from the hydrocarbon feedstock.

33. The process of claim 1, further comprising the steps of:
utilizing the obtained functional fluid to remove CO$_2$ from a gaseous hydrocarbon feedstock having a CO$_2$ component by
(i) contacting the gaseous hydrocarbon feedstock with the functional fluid under conditions of elevated pressure to dissolve the CO$_2$ in the functional fluid;
(ii) separating the gaseous hydrocarbon feedstock from the functional fluid;
(iii) depressurizing the functional fluid to cause the evolution of CO$_2$ gas from the functional fluid.

34. A process as claimed in claim 33, wherein the gaseous hydrocarbon feedstock also comprises sulfur-containing compounds.

35. A process as claimed in claim 33, wherein the functional fluid is provided at a temperature of less than 5° C.

36. A process as claimed in claim 35, wherein the functional fluid is provided at a temperature in the range from about 1° C. to about 3° C.

37. A process as claimed in claim 36, wherein the functional fluid is provided at a temperature of about 2° C.

38. A process as claimed in claim 33, further comprising the step of liquefying the separated $CO_2$ gas.

39. A process as claimed in claim 33, further comprising the step of desulfurizing the gaseous hydrocarbon feedstock obtained in step (ii) by:
   (iv) contacting the gaseous hydrocarbon feedstock with the functional fluid under conditions suitable to form a sulfur-enriched functional fluid; and
   (v) recovering a desulfurizing gaseous hydrocarbon feedstock from the sulfur-enriched functional fluid.

40. A product, comprising:
   a functional fluid, obtained by reacting silicon, alkali metal hydroxide and a solution comprising water and a chlorine source in a reactor vessel at a temperature of no greater than about 200° F. (93° C.), wherein the chlorine source is chlorine gas or liquid chlorine, wherein the functional fluid includes a specific gravity of about 5, and a pH of from about 9 to about 12.

41. The product according to claim 40, wherein the silicon and alkali metal hydroxide are added to the reaction vessel prior to the addition of the solution comprising water and chlorine.

42. The product according to claim 40, wherein the chlorine source is liquid chlorine.

43. The product according to claim 42, wherein the water and liquid chlorine are in a ratio of from about 10:1 to about 30:1 by volume.

44. The product according to claim 43, wherein the water and liquid chlorine are in a ratio of about 20:1 by volume.

45. The product according to claim 40, wherein the amount of silicon to alkali metal hydroxide is in a ratio of from about 1:5 to about 5:1 by volume.

46. The product according to claim 44, wherein the amount of silicon to alkali metal hydroxide is about 1:1 by volume.

47. The product according to claim 46, wherein additional solution comprising water and liquid chlorine is added at a rate sufficient to maintain the reaction until one or more of the metal silicon or alkali metal hydroxide is spent.

48. The product according to claim 40, where the reaction temperature is no greater than about 175° F. (80° C.).

49. The product according to claim 40, wherein the metal of the alkali metal hydroxide is lithium, sodium or potassium.

50. The product according to claim 49, wherein the metal is sodium.

51. The product according to claim 50, wherein the sodium hydroxide is in solid form.

52. The product according to claim 50, wherein the sodium hydroxide is in the form of an aqueous solution.

53. The product according to claim 40, wherein the silicon is silicon metal grade 441.

54. The product according to claim 40, wherein the silicon comprises particles having a mean particle diameter ranging from about 1 mm to about 150 mm.

55. The product according to claim 54, wherein the silicon comprises particles having a mean particle diameter ranging from about 24 mm to about 150 mm.

56. The product according to claim 40, wherein the water is distilled water.

57. The product according to claim 40, wherein the reactor vessel is open to the atmosphere.

58. The product according to claim 40, wherein the reactor vessel is closed to the atmosphere.

59. The product according to claim 51, wherein the silicon and sodium hydroxide in solid form are loaded to a height equivalent of about 30% of the reactor vessel's volume, prior to addition of the solution comprising water and liquid chlorine.

* * * * *